United States Patent [19]

Caunt et al.

[11] 4,111,834
[45] Sep. 5, 1978

[54] PROCESS FOR PREPARING A TRANSITION METAL COMPOUND AND IT'S USE AS A COMPONENT IN AN OLEFIN POLYMERIZATION CATALYST

[75] Inventors: Anthony David Caunt, Welwyn Garden City; Ian Gabriel Williams, Letchworth, both of England

[73] Assignee: Imperial Chemical Industries Limited, London, England

[21] Appl. No.: 688,545

[22] Filed: May 21, 1976

[30] Foreign Application Priority Data

May 28, 1975 [GB] United Kingdom ............... 23336/75
May 28, 1975 [GB] United Kingdom ............... 23335/75

[51] Int. Cl.$^2$ ............................................. B01J 31/02
[52] U.S. Cl. .............................. 252/429 B; 252/429 C
[58] Field of Search ........................ 252/429 B, 429 C

[56] References Cited

U.S. PATENT DOCUMENTS

| | | | |
|---|---|---|---|
| 3,026,311 | 3/1962 | Coover et al. ............... | 252/429 B X |
| 3,219,651 | 11/1965 | Hill et al. ..................... | 252/429 B X |
| 3,342,793 | 9/1967 | Palvarini et al. ............. | 252/429 B X |
| 3,629,222 | 12/1971 | Coover et al. ................ | 252/429 B X |
| 3,639,375 | 2/1972 | Staiger ......................... | 252/429 B X |
| 3,645,993 | 2/1972 | Sunseri ......................... | 252/429 B X |
| 3,758,621 | 9/1973 | Morikawa et al. ........... | 252/429 B X |
| 3,862,257 | 1/1975 | Buben et al. ................. | 252/429 B X |
| 3,888,789 | 6/1975 | Dombro et al. .............. | 252/429 B |
| 3,937,691 | 2/1976 | Staiger et al. ................ | 252/429 B X |
| 3,940,345 | 2/1976 | Caunt ........................... | 252/429 B |

*Primary Examiner*—Winston A. Douglas
*Assistant Examiner*—John F. Niebling
*Attorney, Agent, or Firm*—Cushman, Darby & Cushman

[57] ABSTRACT

A solid compound of a transition metal is ground in the presence of aluminium chloride, titanium tetrachloride and at least one organo-Lewis Base compound. The transition metal compound is typically titanium trichloride. The Lewis Base compound is an organo-phosphorus compound, preferably one which also contains nitrogen, such as 2-dimethylamino-1,3-dimethyl-1,3,2-diazaphospholidine-2-oxide or an organo-sulphur compound such as diphenyl sulphone. The solid compound of the transition metal may include aluminium chloride and if the amount of this aluminium chloride is at least 50% molar, there is no need to make a separate addition of aluminium chloride to the mixture which is ground. The ground product can be used as a component of an olefine polymerization catalyst.

13 Claims, No Drawings

PROCESS FOR PREPARING A TRANSITION METAL COMPOUND AND IT'S USE AS A COMPONENT IN AN OLEFIN POLYMERIZATION CATALYST

The present invention relates to transition metal compounds, the treatment of such compounds and the use of such compounds as a component of an olefine polymerisation catalyst.

According to the present invention a solid compound of a transition metal of Groups IVA to VIA of the Periodic Table is ground in the presence of at least two Lewis Acid compounds which are aluminium chloride and titanium tetrachloride and which are different from the solid compound of the transition metal, and at least one organo-Lewis Base compound.

The solid compound of the transition metal is preferably in a valency state which is less than its maximum valency. The transition metal can be, for example, zirconium or vanadium, but it is particularly preferred to use a compound of titanium. It is preferred that the transition metal compound is a transition metal halide or oxyhalide (for example $VOCl_2$) and in particular a chloride, especially titanium trichloride. The term "titanium trichloride" is used herein to refer not only to pure titanium trichloride, but also titanium trichloride compositions which incorporate other materials, in particular aluminium chloride or alkyl aluminium chlorides. Such forms of titanium trichloride can be obtained, inter alia, by the reduction of titanium tetrachloride with aluminium metal or an organo-aluminium compound. Materials of the type, titanium trichloride/aluminium chloride, which are obtainable by the reduction of titanium tetrachloride with aluminium metal, are particularly preferred.

It will be appreciated that a "Lewis Acid" is a substance which accepts a pair of electrons to form a co-ordinate bond, and that a "Lewis Base" is a substance which donates a pair of electrons to form as co-ordinate bond.

The organo-Lewis Base compound can be any such Lewis Base which is effective to alter the activity and/or stereospecificity of a Ziegler catalyst system. A wide range of such Lewis Bases have been proposed to give such an effect and these include ethers; esters such as methylmethacrylate; ketones; alcohols; thioethers; thioesters; thioketones; thiols; sulphones; sulphonamides; organo-silicon compounds such as the silanes and siloxanes; amides such a formamide; urea and thiourea and the substituted derivatives thereof such as N,N,N',N'-tetramethylurea; alkanolamines such as β(N,N-dimethylamino)ethanol; amines such as triethylamine and tributylamine; cyclic amines such as pyridine, quinoline and substituted derivatives thereof such as α-picoline; diamines such as N,N,N',N'-tetramethylethylenediamine; and the organo phosphines, phosphine oxides, phosphites, and phosphates.

The use of organo-Lewis Base compounds, or complexes including organo-Lewis Base compounds, in olefine polymerisation catalysts, is disclosed, inter alia, in British patent specification Nos. 803,198; 809,717; 880,998; 896,509; 920,118; 921,954; 933,236; 940,125; 966,025; 969,074; 971,248; 1,013,363; 1,017,977; 1,049,723; 1,122,010; 1,150,845; 1,208,815; 1,234,657; 1,324,173; and 1,359,328, Belgian Pat. No. 693,551; and published German Pat. No. 2,234,506 and 2,329,723.

We have found that organo-Lewis Base compounds which contain at least one sulphur, nitrogen or phosphorus atom are particularly useful in the process of the present invention. More specifically, it is preferred that the organo-Lewis Base compound has one of the general formulae

(A)

where
$R^1$, $R^2$ and $R^3$ are each, independently, an alkyl or aryl group, or a group $-NR_2^4$ or $-OR^4$;
$R^4$ is an alkyl group of 1 to 4 carbon atoms; and
$m$ is 0 or 1; or

(B)

where
$R^5$ and $R^6$ are hydrocarbyl groups; and
$R^7$ is a hydrogen atom, an alkyl group or a group

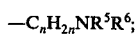

or $R^5$ and $R^6$, optionally with $R^7$, together form a substituted or unsubstituted, saturated or unsaturated, condensed or uncondensed ring system; and
$n$ is 1, 2 or 3; or

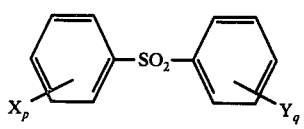
C)

where
X, or each X, is, independently, a halogen atom, an alkyl, aryl, alkoxy, aryloxy, alkylthio, or arylthio group, or a group $-NR^8R^9$, or two groups X can together form a saturated or unsaturated hydrocarbon ring;
Y, or each Y, is, independently, a halogen atom, an alkyl, aryl, alkoxy, aryloxy, alkylthio, or arylthio group, or a group $-NR^8R^9$, or two groups Y can together form a saturated or unsaturated hydrocarbon ring; or a group X and a group Y may be replaced by a link between the two phenyl groups attached to the $-SO_2-$ group, the linkage being either direct or through a group $-O-$, $-CH_2-$, $-NR^8-$, $-S-$ or $-CO-$;
$R^8$ is a hydrogen atom or a hydrocarbyl group;
$R^9$ is a hydrocarbyl group; and
$p$ and $q$ are each, independently, an integer from 0 up to 5; or

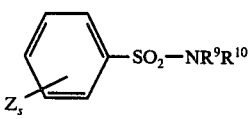
D)

where
Z, or each Z is, independently, a halogen atom, an alkyl, aryl, alkoxy, aryloxy, alklthio, or arylthio group, or a group $-NR^8R^9$, or two groups Z can together form a saturated or unsaturated hydrocarbon ring;
$R^8$ and $R^9$ are as defined;
$R^{10}$ is a hydrocarbyl group or a group

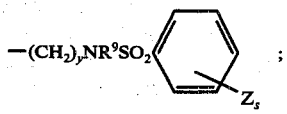

$s$ is an integer from 0 up to 5; and
$y$ is a positive integer; or $$R^{11}R^{12}P(Q)_zED \qquad (E)$$

wherein
$R^{11}$ is halogen, a hydrocarbyl group, a group —$NR_2^9$ or —$OR^9$, a heterocyclic group or a group (E-L-G);
$R^9$ is as defined;
$R^{12}$ is halogen, a hydrocarbyl group, a group —$NR_2^9$ or —$OR^9$, a heterocyclic group, a group (E-L-G) or ED;
each E is —O—, —S—, or —$NR^9$—, and may be the same or different;
G is —$OR^9$, —$SR^9$, —$NR_2^9$, —$PR_2^9$ or a heterocyclic ring system whereof the heteroatom is O, S, N, or P;
D is a group —LG or —$P(Q)_zR^{11}R^{12}$, or, when $R^{12}$ is ED, both the D groups may together form a group —L—;
L is a bivalent hydrocarbyl radical such that E and G or E and E are separated by not more than 3 carbon atoms;
Q is an oxygen or sulphur atom; and
$z$ is 0 or 1; or

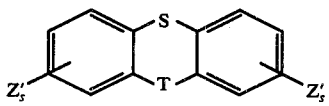
(F)

wherein
T is —S—; —O—; —$NR^9$—; or —CO—;
Z' or each Z' is, independently, a halogen atom an alkyl, aryl, alkoxy, aryloxy, alkylthio, or arylthio group, or a group —$NR^8R^9$; and
$R^8$, $R^9$ and $s$ are all as defined.

In the compounds of formula A, if the groups $R^1$, $R^2$ and $R^3$ are alkyl groups, they preferably contain from 1 up to 6 carbon atoms. The groups $R^1$, $R^2$ and $R^3$ are preferably all the same and m is one. $R^1$, $R^2$ and $R^3$ are preferably all aryl groups or all dialkylamino-groups but if $R^1$ and $R^2$ are both dimethylamino groups, then $R^3$ may be an alkoxy group. Compounds of formula A include tributylphosphine, triphenylphosphine, tributylphosphine oxide, triphenylphosphine oxide, N,N,N',N'-tetramethylethyl phosphorodiamidate and hexamethyl phosphoric triamide.

In the compounds of formula B, it is preferred that $R^7$ is an alkyl group or a group —$C_nH_{2n}NR^5R^6$. $R^5$, $R^6$ and $R^7$ can all be the same and can be alkyl groups containing from 1 up to 6 carbon atoms. If $R^5$ and $R^6$ form a ring system, then $R^7$ can be included with $R^5$ and $R^6$ in the ring system or can be a hydrogen atom or an alkyl group. If the group $R^7$ is —$C_nH_{2n}NR^7NR^5R^6$, n is preferably 2 and $R^5$ and $R^6$ are conveniently methyl groups. Compounds of formula B include di-n-butylamine, triethylamine, tri-n-butylamine, N,N,N',N'-tetramethylethylenediamine, pyridine, piperidine, picoline, quinoline and isoquinoline.

In the compounds of formula C, if X or Y are alkyl, alkoxy or alkylthio groups, it is preferred that the group contains from 1 up to 6 carbon atoms. It is preferred that p and q are zero or one and the groups X and Y are preferably the same. The groups $R^8$ and $R^9$ are conveniently alkyl groups having from 1 up to 6 carbon atoms. If the groups X and Y are replaced by a link between the two phenyl groups attached to the —$SO_2$— group, the linkage is conveniently direct, through an oxygen atom or especially through a —$CH_2$— group. Compounds of formula C include diphenyl sulphone, 4(phenylthio)diphenylsulphone, 4(phenoxy) diphenylsulphone, 2,4'-(diphenoxy)diphenylsulphone, 4,4'-(diphenoxy)diphenylsulphone, 4,4'-dichlorodiphenylsulphone, 4,4'-(dimethyl)diphenylsulphone, 2,4,4'-(trimethyl)diphenylsulphone, 6-phenylsulphonyltetralin, dibenzothiophen-5,5-dioxide, phenoxathiin-10,10-dioxide, thioxanthene-10,10-dioxide and 10-methylphenothiazine-5,5-dioxide.

In the compounds of formula D, the groups $R^8$, $R^9$ and $R^{10}$ are conveniently alkyl groups having from 1 up to 6 carbon atoms, but one, or both, of the groups $R^9$ and $R^{10}$ can be an aryl group. The group Z can be a bromine or a chlorine atom, or a phenoxy group. In the group

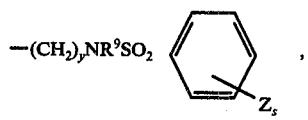

$y$ is conveniently 1, 2 or 3 and $s$ is zero. Compounds of formula D include N,N-dimethylbenzenesulphonamide, N,N-diethylbenzenesulphonamide, N,N-diphenylbenzenesulphonamide, N-methyl-N-phenyl-4-bromobenzenesulphonamide, N-methyl-N-phenyl-4-chlorobenzenesulphonamide, N,N-diethyl-4-phenoxybenzenesulphonamide and N,N'-dibenzenesulphonyl-N,N'-dimethyl-1,2-diaminoethane.

In the compound of formula E, the group D is either a group —LG, in which case the compound is of the type $$R^{11}R^{12}P(Q)_z(E—L—G), \qquad (E1)$$

or the group D is a group

—$P(Q)_zR^{11}R^{12}$, in which case the compound is of the type $$R^{11}R^{12}P(Q)_zEP(Q)_zR^{11}R^{12}, \qquad (E2)$$

or the group $R^{12}$ is ED and the groups D together form a group —L—, in which case the compound is of the type

(E3)

In compounds of the type E1 and E2, the groups $R^{11}$ and $R^{12}$ are conveniently the same, and are alkylamino groups —$NR_2^9$ or alkoxy groups —$OR^9$ in which $R^9$ is a methyl or ethyl group. The group (E-L-G) can be, for example, of the type —$O(CH_2)_xOR^9$; —$O(CH_2)_xNR_2^9$; —$NR^9(CH_2)_xNR_2^9$ or —$S(CH_2)_xNR_2^9$ where $x$ is an integer, particularly 2 or 3.

In compounds of the type E3, the group

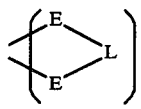

can be, for example, of the type —O(CH$_2$)$_x$O—; —O(CH$_2$)$_x$NR$^9$—; —NR$^9$(CH$_2$)$_x$NR$^9$—or —S(CH$_2$)$_x$-NR$^9$—, where $x$ is as defined, In compounds of the type E1 and E3, it is preferred that at least one of the groups E is —NR$^9$—. However, in compounds of the type E2, the group E between the two phosphorus atoms is conveniently an oxygen atom. It is preferred that z, or each z, is one and Q, or each Q, is an oxygen atom. Compounds of formula E include N,N,N', N',N''-pentamethyl-N''-β-dimethylaminoethyl phosphoric triamide; 2-dimethylamino-1,3-dimethyl-1,3,2-diazaphospholidine-2-oxide; β-dimethylaminoethyl N,N,N'N'-tetramethylphosphorodiamidate; 2-ethoxy-1,3-dimethyl-1,3,2-diazaphospholidine-2-oxide; 2-dimethylamino-1-methyl-1,3,2-azoxaphospholidine oxide and octamethylpyrophosphoramide.

In the compound of the formula F, $s$ is preferably zero, and the compound is phenoxathiin, thianthrene or an N-hydrocarbyl phenothiazine such as N-methyl-phenothiazine.

The proportions of the Lewis Acids and Lewis Bases used depend on the particular Lewis Base, and also on the solid compound of the transition metal. In general, for each gramme atom of the transition metal which is present in the solid compound of the transition metal, there is added sufficient of each Lewis Acid to provide not more than two moles of each Lewis Acid and the number of moles of the Lewis Base does not exceed the number of gramme atoms of the transition metal which is present in the solid compound of the transition metal. Preferably, the amount, in moles, of each Lewis Acid does not exceed the number of gramme atoms of the transition metal which are present in the solid compound of the transition metal. It is preferred that the amount of one of the Lewis Acids is greater than the amount of the other Lewis Acid.

The transition metal compound can contain aluminium chloride associated with it, for example as in the material represented by the general formula TiCl$_3$$a$AlCl$_3$, where $a$ may have a value of up to 1.50. In general, materials of this type have the formula TiCl$_3$$b$AlCl$_3$ where $b$ is 0 up to about 0.33 and using such a material, there is separately added from 0.01 up to 1.50, particularly from 0.05 up to 1.0 and especially from 0.20 up to 0.50 mole of aluminium chloride for each gramme atom of the transition metal which is present in the solid compound of the transition metal. Using a material of the type [TiCl$_3$][0.33 AlCl$_3$], the total amount of aluminium chloride present is in the range from 0.34 up to 1.83, particularly from 0.38 up to 1.33 and especially from 0.53 up to 0.83 mole for each gramme atom of the transition metal. Whilst this total amount of aluminium chloride is very conveniently achieved by the separate addition of aluminium chloride to a transition metal compound which contains no more than only a relatively small proportion (up to about 0.33 mole) of aluminium chloride associated with the transition metal compound, it is possible to use transition metal compounds which contain a sufficient quantity of associated aluminum chloride to avoid the separate addition of aluminium chloride. Such materials are exemplified by products of the formula TiCl$_3$$c$AlCl$_3$ where c is from 0.50 up to 1.50, preferably not more than 1.00 and especially from 0.75 up 0.90, for example [TiCl$_3$][0.83 AlCl$_3$].

It has been found that, in materials containing high proportions of associated aluminium chloride, at least some of the aluminium chloride is resistant to extraction at ambient temperature by a solution of an ether in an aliphatic hydrocarbon solvent, the remainder of the aluminium chloride being soluble in the solution. The residue of contacting an unground material of the type TiCl$_3$cAlCl$_3$ with a solution of di-isoamyl ether in heptane is typically a material of the type TiCl$_3$$d$AlCl$_3$ where $d$ is from 0.25 up to 0.45, particularly from 0.30 up to 0.40.

Materials of the type TiCl$_3$cAlCl$_3$ can be prepared by the reaction of TiCl$_4$ with a solution, in an inert hydrocarbon diluent, of a complex material of the formula TiAl$_2$Cl$_8$ (arene), followed by heating of the reaction product at a temperature of at least 80° C, preferably at least 100° C and not more than 150° C. The product obtained in this manner is preferably washed and, in addition to removing any solvent, particularly aromatic solvent, and unreacted starting material, this washing may remove some aluminium chloride.

The complex material TiAl$_2$Cl$_8$ (arene) is prepared by the reaction between TiCl$_4$, aluminium metal and aluminium chloride in an aromatic solvent, at a temperature in the range from 60° C up to 150° C, for example by refluxing the reactants in the aromatic solvent.

In the grinding process, the proportion of titanium tetrachloride used is in the range from 0.01 up to 0.50, particularly from 0.05 up to 0.30, and especially from 0.10 up to 0.20 mole for each gramme atom of the transition metal which is present in the solid compound of the transition metal.

In general, the proportions of the Lewis Base compound are in the range from 0.10 up to 1.0, preferably from 0.20 up to 0.60, especially from 0.25 up to 0.50 mole, for each gramme atom of the transition metal which is present in the solid compound of the transition metal.

The amount of the organo-Lewis Base compound is conveniently given by the relationship L.B. = [TiCl$_4$] + 0.5 [AlCl$_3$] ± 0.10 where

L.B. is the amount of the organo-Lewis Base compound in moles;

[TiCl$_4$] is the amount of titanium tetrachloride in mole; and

[AlCl$_3$] is the total amount of aluminium chloride in moles, including any aluminium chloride which is present associated with the transition metal compound, for example as in the materials [TiCl$_3$][0.33 AlCl$_3$] and [TiCl$_3$][0.83 AlCl$_3$].

As a particularly preferred aspect of the present invention titanium trichloride is ground in the presence of at least from 0.34 up to 1.83 mole of aluminium chloride, from 0.01 up to 0.50 mole of titanium tetrachloride and from 0.10 up to 1.0 mole of at least one organo-Lewis Base compound for each gramme atom of titanium which is present in the titanium trichloride.

The grinding is conveniently effected using a ball mill and it is preferred that at least a proportion of the grinding is effected in the dry state - that is, in the absence of added solvent and suspending liquids. The materials to be ground can be introduced into the mill, or other grinding apparatus, either in the absence of solvents or as a solution or suspension in a suitable inert diluent which is subsequently removed either by heating, reducing the pressure, or both. The grinding can be effected at any suitable temperature and satisfactory results may be obtained by grinding at ambient temperature (about 20°–25° C) although it will be realised that higher or lower temperatures may be used if desired, for example from −10° C up to 100° C. Grinding is effected for any suitable length of time, such as from 5 hours up to 100 hours or more, for example from 24 up to 72 hours. It will be appreciated that the grinding time will be dependent on the intensity of the grinding and, when using a rotating ball mill which gives a tumbling action, will depend on the material, size and number of balls used, and the speed of revolution of the ball mill. Other grinding techniques may be used, for example grinding in a vibrating mill, and when using such other techniques different times and temperatures of grinding may be preferred.

The ground product may be removed from the grinding apparatus as a dry solid but it may be more readily removed by adding a suitable liquid medium, in particular an inert organic liquid such as an aliphatic hydrocarbon, and removing the ground solid as a suspension in the liquid medium. If desired, to facilitate removal of the suspension, a short period, typically not more than 30 minutes, of wet grinding may be effected at the end of the dry milling stage.

The process of the present invention is effected in an inert atmosphere, in the absence of any quantity of such oxygen-containing materials as air and water vapour, which quantity is sufficient to deleteriously affect the characteristics of the ground product as a component of an olefine polymerisation catalyst. It may be found advantageous to wash the ground product with a suitable liquid medium, for example, an inert aliphatic or aromatic hydrocarbon liquid before it is used as a component of an olefine polymerisation catalyst.

The ground transition metal compound is suitable for use as a component of a catalyst for the polymerisation of ethylenically unsaturated hydrocarbon monomers.

Thus, according to a further aspect of the present invention, there is provided an olefine polymerisation catalyst comprising 1. a transition metal component which is the product of grinding a solid compound of a transition metal of Groups IVA to VIA of the Periodic Table in the presence of at least two Lewis Acid compounds which are aluminium chloride and titanium tetrachloride and which are different from the solid compound of the transition metal, and at least one organo-Lewis Base compound; and
2. at least one organo-metallic compound of aluminium, or of a non-transition metal of Group IIA of the Periodic Table, or a complex of an organo-metallic compound of a non-transition metal of Group IA or IIA of the Periodic Table and an organo-aluminium compound.

Component (1) of the catalyst is a material obtained in the manner hereinbefore defined.

Component (2), the organo-metallic compound, can be a Grignard reagent which is substantially ether-free, or a compound of the type $Mg(C_6H_5)_2$. Alternatively, component (2) can be a complex of an organo-metallic compound of a metal of Groups IA or IIA, such as, for example $Mg(AlEt_4)_2$ or a lithium aluminium tetraalkyl. It is preferred that component (2) is an organo-aluminium compound such as a bis(dialkylaluminium)oxyalkane, a bis(dialkylaluminium)oxide, an aluminium hydrocarbyl sulphate, an aluminium hydrocarbyl oxyhydrocarbyl or particularly an aluminium trihydrocarbyl or a dihydrocarbylaluminium hydride or halide especially aluminium triethyl or diethylaluminium chloride. A mixture of compounds can be used if desired, for example a mixture of an aluminium trialkyl and a dialkylaluminium halide. It may be preferred to use catalysts giving a low level of residual halogen in the polymer product, in which case component (2) is desirably a halogen-free compound, particularly an aluminium trihydrocarbyl.

In addition to components (1) and (2), the catalyst can include one or more further components. Thus, the catalyst can include at least one organo-Lewis Base compound (component 3)). The organo-Lewis Base compound can be the same as that which is used in the production of component (1) of the catalyst. However, whilst it is preferred that component 3) is an organo-Lewis Base compound of one of the formulae (A) to (F), especially (A), (B) or (E), other organo-Lewis Base compounds can be used, such as, for example ethers and thioethers; alcohols and thiols; ketones and thioketones; organo-silicon compounds such as the silanes and siloxanes; amides such as formamide; urea and thiourea and the substituted derivatives thereof such as N,N,N',N'-tetramethylurea and alkanolamines such as β(N,N-dimethylamino)ethanol. Particularly preferred organo-Lewis Bases are the secondary and tertiary amines such as dibutylamine, triethylamine or tributylamine, diamines such as N,N,N',N'-tetramethylethylenediamine, and compounds containing both nitrogen and phosphorus atoms such as hexamethyl phosphoric triamide, ethyl N,N,N',N'-tetramethylphosphorodiamidate, N,N,N',N',N''-pentamethyl-N''-β-dimethylaminoethyl phosphoric triamide; 2-dimethylamino-1,3-dimethyl-1,3,2-diazaphospholidine-2-oxide and octamethylpyrophosphoramide.

In addition to, or instead of, the organo-Lewis Base compound which may be present as component (3), the catalyst system can include a substituted or unsubstituted polyene (component 4)), which may be an acyclic polyene such as 3-methyl-1,4,6-heptatriene or a cyclic polyene such as cyclooctatriene, cyclooctatetraene or cycloheptatriene or derivatives of such polyenes such as the alkyl- or alkoxy-substituted polyenes; tropylium salts or complexes, tropolone or tropone.

The proportions of the various catalyst components can be varied widely depending both on the materials used and the absolute concentrations of the components. However, in general for each gramme atom of the transition metal which is present in component (1) of the catalyst, there is present at least 0.05, and preferably at least 1.0 mole, of component (2); but it may be desirable to use much greater quantities of component (2), for example as many as 50 mole or even more, for each gramme atom of the transition metal which is present in component (1). In general we prefer to use not more than 25, and particularly not more than 10, mole of component (2) for each gramme atom of the transition metal which is present in component (1). The amount of the organo-Lewis Base compound, which is the optional component (3), is in the range from 0.01 up to 10, preferably from 0.05 up to 5.0, and especially from 0.2 up to 2, mole for each gramme atom of the transition metal which is present in component (1) of the catalyst, and the amount, in moles, of component (3)

is less than the amount, in moles, of component (2). The number of moles of any polyene which is present in the catalyst is preferably less than the number of moles of component (2) of the catalyst. For each mole of component (2), there are conveniently present from 0.01 up to 1.0, especially 0.05 up to 0.5, for example 0.2 mole, of the polyene. If the catalyst includes both components (3) and (4) the number of moles of the organo-Lewis Base compound which is compound (3) and the polyene should preferably, in total, be less than the number of moles of component (2) of the catalyst. If the catalyst includes both components (3) and (4), these can conveniently be used in equimolar proportions but the relative proportions of these components may be varied to give the optimum result.

A preferred catalyst within the present invention comprises:

1. a titanium trichloride containing material obtained by milling a titanium trichloride material in the presence of titanium tetrachloride, aluminium chloride and at least one organo-Lewis Base compound which is selected from materials of the formulae:

$R^1R^2R^3P(O)_m;$     (A)

$R^5R^6R^7N;$     (B)

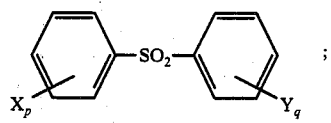      C)

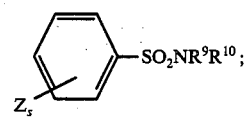      D)

$R^{11}R^{12}P(Q)_zED;$     (E)

and

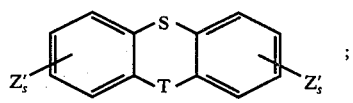      F)

2. at least one organo-aluminium compound; and optionally
3. a further quantity of an organo-Lewis Base compound which is selected from materials of the formulae A, B, C, D, E or F (as hereinbefore defined), where D, E, $R^1$, $R^2$, $R^3$, $R^5$, $R^6$, $R^7$, $R^9$, $R^{10}$, $R^{11}$, $R^{12}$, Q, T, X, Y, Z, Z', m, p, q, s and z are all as hereinbefore defined.

The Lewis Base which is component 3) of the catalyst is conveniently hexamethyl phosphoric triamide; 2-dimethylamino-1,3-dimethyl-1,3,2-diazaphospholidine-2-oxide; N,N,N',N',N''-pentamethyl-N''-β-dimethylaminoethylphosphoric triamide; N,N,N',N'-tetramethylethylenediamine; tributylamine or diphenylsulphone.

The catalysts of the present invention are particularly suitable for the polymerisation and copolymerisation of olefine monomers by contacting at least one olefine monomer with a catalyst of the type hereinbefore defined.

More specifically, there is provided a process for the production of a polymer or copolymer of an olefine monomer wherein at least one olefine monomer, or a mixture of at least one olefine monomer and ethylene, is contacted with an olefine polymerisation catalyst as hereinbefore defined.

Any olefine monomer, particularly mono-α-olefine monomer, which is capable of being polymerised using a Ziegler catalyst may be polymerised by the process of the present invention. Thus, monomers which can be polymerised by the present process include butene-1, and 4-methylpentene-1 and particularly propylene. These olefines may be copolymerised together but we prefer to effect copolymerisation with ethylene, conveniently using a sequential polymerisation process such as described in British patent specification Nos. 970,478; 970,479 and 1,014,944.

We have found that the process of the present invention can be used for the polymerisation of propylene to give a high yield of polymer relative to the amount of catalyst used and also a relatively low proportion of the undesirable soluble polymer.

It is well known that catalysts of the "Ziegler" type are susceptible to the effects of impurities and the activity and stereospecificity of such catalysts can be effected in a detrimental manner by the presence of small quantities of impurities, particularly oxygen and polar compounds such as water and alcohol in the monomer and/or diluent when used. Thus, for the polymerisation of olefine monomers using Ziegler catalysts, it is known to use pure monomers and diluents. However, when using catalysts in accordance with the present invention, these can be used in smaller proportions than the conventional Ziegler type catalyst and accordingly are more susceptible to any impurities present in the system. Thus, for use with the catalyst of the present invention, it is desirable that the monomers and any diluents which are of commercial purity are subjected to a further purification procedure.

The purification treatment can be effected in more than one stage if desired. The particular purification treatment used will be dependent on the purity of the starting materials.

Satisfactory purity can be achieved in most cases by passing the monomer (and diluent, if used) through a bed of a material which is capable of absorbing the impurities contained in the monomer or diluent, for example as described in British patent specification Nos. 1,111,493 and 1,226,659.

Using catalysts in accordance with the present invention, polymerisation can be carried out in the presence or absence of an inert diluent such as a suitably purified paraffinic hydrocarbon. If a diluent is not used, polymerisation can be effected in the liquid phase using excess liquid monomer as the suspension medium for catalyst and polymer product. If the monomer is used in the gaseous phase, polymerisation can be effected using any technique suitable for effecting a gas/solid reaction such as a fluidised bed reactor system or a ribbon blender type of reactor.

Polymerisation may be effected either in a batch manner or on a continuous basis. The catalyst components may be introduced into the polymerisation vessel separately but it may be preferred, particularly if polymerisation is being effected on a continuous basis, to mix all the catalyst components together before they are introduced into the polymerisation reactor. Alternatively, in a batch process, not all of the catalyst is added at the beginning of the polymerisation. Thus, a proportion of the catalyst may be added to initiate polymerisation and further quantities of one or more of the catalyst components are added at one or more times during the polymerisation. Conveniently at least 25% of each catalyst component is added to initiate polymerisation, the remaining catalyst components being added during the polymerisation. Since feeding a slurry of a solid material may be inconvenient, it may be preferred that all of the transition metal compound is added, together with some of each of the other catalyst components, to initiate polymerisation and the rest of the other catalyst components are added during the polymerisation.

The polymerisation can be effected in the presence of a chain transfer agent, such as hydrogen or a zinc dialkyl, in order to control the molecular weight of the product formed. The chain transfer agent, if present, is conveniently hydrogen which is present in an amount of up to 25% molar relative to the monomer, conveniently in an amount of from 0.10 up to 2.0% molar relative to the monomer, or monomers, being polymerised. The amount of chain transfer agent used is dependent on the polymerisation temperature which is typically in the range from 20° up to 100° C., especially from 60° up to 85° C.

Using catalysts in accordance with the present invention, particularly catalysts which also include further organic Lewis Base as component (3) of the catalyst, we have been able to polymerise propylene to obtain a high yield, relative to the amount of catalyst used, of a polymer having a high flexural modulus which in some cases may be as high as that of commercially available propylene polymers which have been obtained in a lower yield and from which a catalyst removal step is necessary.

Thus, when using a catalyst containing titanium trichloride, a propylene polymer can be obtained wherein the titanium content of the polymer derived from the residual catalyst in the polymer is not more than about 100 parts per million (ppm), by weight and the flexural modulus of the polymer is at least 1.00 GN/m².

The flexural modulus of the polymer is the modulus as measured by the apparatus described in Polymer Age, March 1970, pages 57 and 58 at 1% skin strain after 60 seconds at 23° C. and 50% relative humidity using test samples prepared as in Examples 23 to 27.

The titanium content of the polymer may be determined by any suitable analytical technique and we have found X-ray fluorescence spectrometry to be a particularly convenient technique of analysis.

Using the process of the present invention, polymers, particularly propylene homopolymers, can be obtained which have a flexural modulus of at least 1.30 GN/m².

Propylene polymers obtained by the process of the present invention are the direct product of polymerisation and are obtained without subjecting the polymer to any treatment to remove either catalyst residue or undesirable polymeric materials, such as atactic polymers, polymers of low crystallinity or crystalline polymers of low molecular weight, from the polymerisation product. Whilst such polymers are obtained without an extraction process, the flexural modulus can be increased by extraction with a suitable solvent. Whilst it is possible to use a high boiling aliphatic hydrocarbon such as heptane for such an extraction, we have found that extraction with low boiling solvents which extract only a small proportion, typically between 2 and 4% by weight of the polymer, can produce a significant increase in the modulus of the polymer.

Polymers in accordance with the present invention have a high molecular weight as indicated by the melt flow index measured according to ASTM Test Method D 1238-70, using Condition N (that is, a temperature of 190° C. and a weight of 10 kg). Polymers in accordance with the present invention have a melt flow index of less than 200. Preferred polymers have a melt flow index of less than 100, particularly less than 50, for example between 5 and 50.

Various aspects of the present invention will now be described with reference to the following Examples which are illustrative of the invention. In the Examples, all operations were effected under an atmosphere of nitrogen unless otherwise indicated.

EXAMPLES 1 to 9

Into a stainless steel mill of 15.2 cm in length and 7.9 cm in diameter, and fitted internally with four metal strips, were introduced 200 stainless steel balls of 12.7 mm diameter and 200 stainless steel balls of 6.35 mm diameter. The mill was sealed, evacuated to 0.2 mm of mercury, and purged with nitrogen, to give a nitrogen atmosphere in the mill. 20 g of titanium trichloride (Stauffer-TiCl₃-AA of the approximate formula [TiCl$_3$][0.33AlCl$_3$]) was introduced as a solid into the mill which was shaken manually. Aluminum chloride was added and the mill was rotated at 120 rpm for 30 minutes, without applying any heating or cooling. Rotation of the mill was stopped and titanium tetrachloride was added to the contents of the mill and milling was then continued for 16 hours. Rotation of the mill was stopped and 2-dimethylamino-1,3-dimethyl-1,3,2-diazaphospholidine-2-oxide was added and milling was continued for a further 24 hours.

At the end of the milling, the titanium trichloride product was suspended in an inert aliphatic hydrocarbon liquid (boiling point range of about 170°–180° C.) and readily removed from the mill.

The quantities of the materials used for the various millings are set out in Table 1.

TABLE 1

| Example or Comparative Example | Proportion of Material Milled (a) | | |
| --- | --- | --- | --- |
| | TiCl$_4$ | AlCl$_3$ | DDDPO(b) |
| 1 | 10 | 10 | 25 |
| 2 | 10 | 20 | 25 |
| 3 | 10 | 20 | 35 |
| 4 | 10 | 20 | 40 |
| 5 | 10 | 30 | 40 |
| 6 | 10 | 50 | 35 |
| 7 | 10 | 50 | 50 |
| 8 | 10 | 70 | 50 |
| 9 | 10 | 90 | 50 |
| A | 10 | 0 | 20 |
| B | 10 | 0 | 25 |
| C | 10 | 0 | 30 |
| D | 10 | 0 | 35 |

Notes to Table 1
(a) Moles % for each gramme atom of titanium present in Stauffer-TiCl$_3$-AA
(b) DDDPO is 2-dimethylamino-1,3-dimethyl-1,3,2-diaza-phospholidine-2-oxide.

EXAMPLES 10 to 18

The products of Examples 1 to 9 and the comparative examples were used to polymerise propylene.

The propylene used for the polymerisation had been purified by passing gaseous propylene in turn through a column (7.6 cm in diameter, 0.9 m in length) containing 1.6 mm granules of Alcoa F1 alumina at 50°–60° C., and then through a similar column containing BTS catalyst (cupric oxide reduced to finely divided metallic copper on a magnesium oxide support) at 40°–50° C., condensing the issue gas and passing the liquid propylene through four columns (all 7.6 cm in diameter; two of 0.9 m in length, two of 1.8 m in length) at 25° C., each containing 1.6 mm pellets of Union Carbide 3A molecular sieves.

This treatment reduced the water content of the monomer from 5–10 ppm by volume to <1 ppm by volume and the oxygen content from 1–2 ppm by volume to <0.5 ppm by volume. The level of inert compounds (nitrogen, ethane, etc.) was unchanged at 0.3% and the level of unsaturated hydrocarbons (allene, methylacetylene etc.) was unchanged at <1 ppm.

A polymerisation flask equipped with efficient stirrer and a water jacket was dried carefully and 1 litre of an inert hydrocarbon diluent having a boiling range of about 170°–180° C. was introduced. The diluent was evacuated at 60° C. purged with nitrogen and evacuated which treatment effectively reduced the water and oxygen contents of the diluent to below 10 ppm by weight.

The diluent was then saturated with the purified propylene to one atmosphere pressure. 8 millimole of triethyl aluminium was introduced into the polymerisation flask, and 4 millimole of an organo-Lewis Base compound, as shown in Table 2, was introduced directly after the aluminium alkyl compound. After half an hour, 2 millimole of TiCl$_3$, obtained as described in Examples 1 to 9, was introduced into the polymerisation flask. The pressure in the polymerisation flask was maintained at one atmosphere by supply of propylene from a burette. After a period of 2.5 hours from the introduction of the TiCl$_3$, the run was terminated with 10 ml of isopropanol and a sample of supernatant liquid extracted for determining the concentration of soluble polymer dissolved in the polymerisation diluent. The solid was filtered and washed three times with petrol ether and dried in a vacuum oven at 120° C. for an hour. The yield of solid plus calculated soluble polymer equalled within experimental error the propylene loss from the burette. The results obtained are set out in Table 2.

TABLE 2

| Example or Comparative Example | Form of TiCl$_3$ (b) (d) | Lewis Base | Yield of Solid Polymer (g/mMol TiCl$_3$) (e) | % Weight of Soluble Polymer (f) |
|---|---|---|---|---|
| 10 | 1 | DDDPO | 69.5 | 3.2 |
| 11 | 2 | DDDPO | 50.6 | 2.1 |
| 12 | 3 | HMPT | 72.0 | 2.0 |
| 13 | 4 | HMPT | 52.1 | 2.2 |
| 14 | 5 | HMPT | 62.5 | 2.2 |
| 15 | 6 | HMPT | 79.0 | 3.1 |
| 16 | 7 | HMPT | 78.4 | 2.1 |
| 17 | 8 | HMPT | 65.9 | 2.4 |
| 18 | 9 | HMPT | 70.5 | 2.2 |
| E | A | HMPT | 17.4 | 4.1 |
| F | B | HMPT | 67.1 | 2.4 |
| G | C | HMPT | 55.6 | 1.9 |
| H | D | DDDPO | 35.3 | 3.5 |

Notes to Table 2
(b) As defined in Notes to Table 1
(c) Number refers to Examples in Table 1
(d) HMPT is hexamethyl Phosphoric triamide
(e) Based on solid polymer only relative to the TiCl$_3$ content of the catalyst
(f) % based on total polymer (solid + soluble) formed.

EXAMPLES 19 to 22

The procedure of Examples 10 to 18 was repeated except that the catalyst consisted of 16 millimole of triethyl aluminium, 1.6 millimole of 1,3,5-cycloheptatriene, 0.8 millimole of N,N,N′,N′-tetramethylethylenediamine and 2.0 millimole of titanium trichloride. The order of addition was aluminium alkyl, cycloheptatriene and then the diamine; and, after stirring for half an hour, the titanium trichloride was added. Polymerisation was effected for 3.5 hours using propylene containing from 0.10 up to 0.15% molar of hydrogen. The results are set out in Table 3.

TABLE 3

| Example | Form of TiCl$_3$ | Yield of Solid Polymer (g/mM TiCl$_3$) (e) | % Weight of Soluble Polymer (f) |
|---|---|---|---|
| 19 | 3 | 18.2 | 2.1 |
| 20 | 5 | 21.5 | 2.5 |
| 21 | 6 | 19.7 | 3.2 |
| 22 | 7 | 18.5 | 2.9 |

Notes to Table 3
(e) and (f) are as defined in Notes to Table 2.

EXAMPLES 23 to 27

The milled titanium trichloride product of Example 3 was used for the polymerisation of liquid propylene.

Polymerisation was carried out in a stainless steel autoclave, of total capacity 8 litres, which was fitted with a water-circulation jacket and a vertical anchor stirrer. The autoclave was heated to 70° C., evacuated, and the vacuum was released with propylene (purified as in Examples 10 to 18). The autoclave was then evacuated again and the procedure repeated 5 times and the autoclave was finally brought to a pressure of 2 psi (14 kN/m$^2$) gauge with propylene gas at 25° C. A heptane solution containing 16 millimole of aluminium triethyl was added to the autoclave, followed by 1.6 millimole of 1,3,5-cycloheptatriene, and N,N,N′,N′-tetramethylethylenediamine (in the amount specified in Table 4) and 2 millimole of the milled titanium trichloride product of Example 3. 5 litres of liquid propylene was added to the autoclave immediately after the addition of the titanium trichloride, the stirrer being operated at 150 rpm. This propylene addition was effected by allowing 5.5 litres of liquid propylene to transfer from a burette at 50° C. to the autoclave. Hydrogen (in the amount specified in Table 4) was added and the temperature of the autoclave contents was raised to 65° C. over 10 minutes. The hydrogen was commercially available hydrogen (99.99% pure) which had been further purified by passing through a column (21 cm in diameter and 1.2 m in length) containing a molecular sieve material (Union Carbide 3A) at 20° C. The hydrogen was stored in the sieve column and drawn off as required. Polymerisation was allowed to proceed at a temperature of 65° C. and a pressure of 435 psi (3.0 MN/m$^2$)gauge. More hydrogen (60 millimole on each occasion) was added every 30 minutes. After polymerisation for 4 hours, the autoclave was vented over a period of 10 minutes to remove unpolymerised propylene, and a free-flowing, grey powder was obtained. The proportions of N,N,N′,N′-tetramethylethylenediamine and initial hydrogen addition are set out in Table 4, together with the polymerisation results obtained.

TABLE 4

| Example | Initial H₂ Addition (mM) | TMED Amount (mM) (g) | Yield of Solid Polymer (g/mM TiCl₃) (e) | Ti (ppm) by wt) (h) | % Weight Residual Soluble Polymer (j) | MFI (k) | Flexural Modulus (GNm⁻²) (l) |
|---|---|---|---|---|---|---|---|
| 23 | 200 | 0.8 | 763 | 64 | 7.3 | 6.8 | 1.24 |
| 24 | 400 | 0.8 | 605 | 86 | 8.5 | 33 | 1.27 |
| 25 | 300 | 1.6 | 566 | 87 | 6.2 | 25 | 1.24 |
| 26 | 600 | 1.6 | 605 | 95 | 7.8 | 65 | 1.41 |
| 27 | 300 | 3.2 | 405 | 122 | 6.4 | 64.5 | 1.47 |

Notes to Table 4
(e) is as defined in Notes to Table 2.
(g) TMED is N,N,N',N'-tetramethylethylenediamine
(h) Ti Content was determined experimentally by X-ray fluorescence spectrometry.
(j) The proportion of residual soluble polymer was determined by adding 1 g of solid polymer to 50 ml of the inert hydrocarbon diluent (described in Examples 10 to 18), and heating the mixture to 180° C and maintaining this temperature until the polymer had fully dissolved. The solution was cooled to 60° C and maintained at this temperature, with stirring, for 18 hours. The precipitated polymer was separated by filtration at 60° C, and the proportion of polymer which remained dissolved in the hydrocarbon diluent determined by evaporating the solution to dryness.
(k) The MFI (melt flow index) was measured by ASTMTest Method D 1238-70, condition N (190° C and 10 kg).
(l) The flexural modulus was measured using a cantilever beam apparatus as described in Polymer Age, March 1970, pages 57 and 58. The deformation of a test strip at 1% skin strain after 60 seconds at 23° C and 50% relative humidity was measured.

The test strip had dimensions of approximately 150 × 19 × 1.6 mm and was prepared as follows: 23 g of the polymer was mixed with 0.1% by weight of an antioxidant ('Topanol' CA), and the mixture was added to a Brabender Plasticiser, at 190° C., 30 rpm and under a load of 10 kg to convert it to a crepe. The crepe was placed within a template, between aluminium foil, and pressed by means of an electric Tangye Press at a temperature of 250° C. The pressing was pre-heated for a period of six minutes, under just enough pressure to make the polymer flow across the template - that is, an applied force of about 1 ton. After the pre-heat period, the applied force was raised to 15 tons in 5 ton increments, de-gassing (that is releasing pressure) every 5 tons. After 2 minutes at 15 tons, the press was cooled by means of air and water for 10 minutes or until room temperature was reached. The plaque obtained was then cut into strips of dimensions 150 × 19 × 1.6 mm. Duplicate strips of each polymer were placed into an annealing oven at 130° C., and after 2 hours at this temperature the heat was switched off and the oven cooled to ambient temperature at 15° C. per hour.

EXAMPLES 28 TO 34

The milling procedure of Examples 1 to 9 was repeated using Stauffer-TiCl₃-AA or Toho TiCl₃-T (essentially pure TiCl₃), and differeing amounts of aluminium chloride, titanium tetrachloride and diphenyl sulphone. The titanium trichloride and aluminium chloride were milled together for 42 hours, then diphenyl sulphone and titanium tetrachloride were added and milling was continued for a further 22 hours. During the milling water at 20° C. was run over the outside of the mill.

The quantities of the materials used for the various millings are set out in Table 5.

TABLE 5

| Example or Comparative Example (m) | Type of TiCl₃ (n) | Proportions of Material Milled(p) | | |
|---|---|---|---|---|
| | | AlCl₃ | TiCl₄ | DPS (q) |
| 28 | T | 50 | 5 | 30 |
| J* | T | NIL | NIL | NIL |
| K | T | 51 | NIL | 31 |
| 29 | A | 50 | 5 | 48 |
| 30 | A | 50 | 10 | 48 |
| 31 | A | 50 | 20 | 48 |
| 32 | A | 50 | 30 | 48 |

TABLE 5-continued

| Example or Comparative Example (m) | Type of TiCl₃ (n) | Proportions of Material Milled(p) | | |
|---|---|---|---|---|
| | | AlCl₃ | TiCl₄ | DPS (q) |
| 33 | A | 50 | 10 | 36 |
| 34 | A | 50 | 10 | 60 |
| L** | A | NIL | NIL | NIL |

Notes to Table 5
(m) *Milled for 64 hours alone. **Milled for 24 hours alone.
(n) T indicates ToHo TiCl₃-T A indicates Stauffer TiCl₃-AA.
(p)Moles % for each gramme atom of titanium present in Toho TiCl₃-T or Stauffer TiCl₃AA.
(q) DPS is diphenyl sulphone.

EXAMPLES 35 TO 41

Polymerisations were carried out using the procedure described in Examples 10 to 18 with the exception that in all cases 4 millimole of diphenyl sulphone were used as the Lewis Base component. The results obtained are set out in Table 6.

TABLE 6

| Example or Comparative Example | Form of TiCl₃ | Yield of Solid Polymer (g/mM TiCl₃) (e) | % Weight of Soluble Polymer (f) |
|---|---|---|---|
| 35 | 28 | 16.1 | 8.7 |
| M | J | 9.2 | 10.2 |
| N | K | 12.4 | 9.3 |
| 36 | 29 | 20.2 | 5.9 |
| 37 | 30 | 28.3 | 4.3 |
| 38 | 31 | 24.4 | 5.1 |
| 39 | 32 | 16.5 | 9.7 |
| 40 | 33 | 13.0 | 8.5 |
| 41 | 34 | 20.3 | 5.4 |
| P | L | 18.4 | 9.3 |

Notes to Table 6
(e) and (f) are as defined in Notes to Table 2.

EXAMPLES 42 TO 48

Polymerisation was effected for four hours at 70° C. using propylene containing 0.12 mole % of hydrogen and a catalyst system containing 2 millimole titanium trichloride, 10 millimole diethyl aluminium chloride and 1 millimole tri-n-butyl amine. The results obtained are set out in Table 7.

TABLE 7

| Example or Comparative Example | Form of TiCl₃ | Yield of Solid Polymer (g/mM TiCl₃) (e) | % Weight of Soluble Polymer (f) |
|---|---|---|---|
| 42 | 28 | 23.4 | 3.2 |
| Q | J | 19.1 | 19.2 |
| R | K | 20.5 | 3.9 |
| 43 | 29 | 25.0 | 2.4 |
| 44 | 30 | 35.6 | 1.3 |
| 45 | 31 | 22.1 | 1.8 |
| 46 | 32 | 10.2 | 3.0 |
| 47 | 33 | 18.6 | 1.6 |
| 48 | 34 | 26.5 | 1.7 |
| S | L | 37.3 | 5.8 |

Notes to Table 7
(e) and (f) are as defined in Notes to Table 2.

A further series of experiments were carried out using a material which, by analysis, had the formula

[TiCl₃][0.83AlCl₃].

Treatment of 1.94 g of this material at ambient temperature by shaking for 3 hours with a solution of 5 ml of di-isoamyl ether and 20 ml of heptane gave a solid residue which, by analysis, had the formula

[TiCl₃][0.394AlCl₃].

The material [TiCl₃][0.83AlCl₃] was used in a series of millings as an alternative to a titanium trichloride product of lower, or zero, aluminium chloride content with added aluminium chloride.

Production of TiCl₃.0.83.AlCl₃

A. Preparation of TiAl₂Cl₈ (toluene) complex

A 5 liter glass flask, fitted with a stirrer, thermometer and inlet for nitrogen, was evacuated and the vacuum released by the addition of nitrogen gas. To the flask was added 100.2 g of aluminium powder and 160 g of aluminium chloride. The flask and its contents were heated to a temperature of 120° C. which was maintained for 30 minutes and the flask and its contents were cooled to ambient temperature. 1500 ml of toluene were added, the flask was evacuated and the vacuum was released by the addition of nitrogen gas.

A condenser with a nitrogen inlet, and a dropping funnel, were secured to the flask, the contents of the flask were stirred and the flask heated to reflux the toluene (about 110° C.). 67 ml of titanium tetrachloride were added to the flask from the dropping funnel over a period of 30 minutes. Refluxing of the contents of the flask was continued for a total time of six hours and then heating of the flask was terminated and the reaction mixture allowed to cool.

Whilst still warm (about 50° C.), the reaction mixture was filtered, into a further 5 liter flask containing a nitrogen atmosphere, in order to remove unreacted aluminium. The reaction flask was washed three times, with 250 ml of toluene for each wash, and the wash liquors were also filtered into the further 5 litre flask.

B. Reaction of TiAl₂Cl₈ (toluene) and complex and TiCl₄

The contents of the further flask were stirred and heated up to 80° C. 67 ml of TiCl₄ were added slowly and a dark brown precipitate was formed. After 30 minutes at 80° C., the mixture was cooled and 1500 ml of an aliphatic hydrocarbon liquid (a mixture of C₁₂ isomers of boiling point about 170° to 180° C.) were added.

The mixture was heated once more to a distil off the toluene. After two liters of toluene had been collected, a further 300 ml of the aliphatic hydrocarbon liquid were added and distillation of the toluene was continued. At the last of the toluene was distilled off, the colour of the precipitate changed to a purple-pink colour.

When all the toluene had been distilled off, the flask and its contents were allowed to cool to 60° C., stirring was stopped and the solid in the flask was allowed to settle. The supernatant liquor was removed and the solid was resuspended in 500 ml of toluene at a temperature of about 60° C. The solid was allowed to settle and the supernatant toluene was removed. This procedure was repeated a further nine times. The procedure used with toluene was then effected five times using 400 ml of pentane (at ambient temperature) each time.

The solid was then dried at ambient temperature at reduced pressure (about 10 mm of mercury) for a period of 11 hours to give the product [TiCl₃][0.83AlCl₃].

EXAMPLES 49 TO 51

The milling procedure of Examples 1 to 9 was repeated with the exception that about 20 gm of the material [TiCl₃][0.83AlCl₃], (prepared as described) were introduced as a solid into the mill, which was then rotated at 120 rpm for 40 hours. Titanium tetrachloride was then added to the mill in the amount shown in Table 8, milling was continued for a further 16 hours, and 2-dimethylamino-1,3-dimethyl-1,3,2-diazaphospholidine-2-oxide was added to the mill in the amount shown in Table 8. Milling was then continued for a further 24 hours. No heating or cooling was applied to the mill during the milling.

After milling for a total of 80 hours, rotation of the mill was stopped and the titanium trichloride product was suspended in an inert hydrocarbon diluent and readily removed from the mill.

TABLE 8

| Example No. | Mole % additive (r) | |
|---|---|---|
| | TiCl₄ | DDDPO (b) |
| 49 | 10 | 25 |
| 50 | 10 | 35 |
| 51 | 20 | 35 |

Notes to Table 8
(b) is as defined in Notes to Table 1.
(r) Moles % for each gramme atom of titanium present in [TiCl₃][0.83AlCl₃].

EXAMPLE 52

The procedure of Examples 49 to 51 was repeated except that the material [TiCl₃][0.83AlCl₃] and 10% mole of TiCl₄ (relative to the TiCl₃ content of the [TiCl₃][0.83AlCl₃] material) were both added initially to the mill, the mixture was milled for 16 hours, 35% mole of 2-dimethylamino-1,3-dimethyl-1,3,2-diazaphospholidine-2-oxide (relative to the TiCl₃ content of the [TiCl₃][0.83AlCl₃] material) were added and the milling was continued for a further 24 hours.

EXAMPLE 53

The procedure of Example 52 was repeated except that 50% mole of 2-dimethylamino-1,3-dimethyl-1,3,2-diazaphospholidine-2-oxide were added.

EXAMPLE 54

The procedure of Example 50 was repeated except that all the components were added to the mill initially and milling was effected for 40 hours.

EXAMPLES 55 TO 60

The titanium trichloride products of Examples 49 to 54 were used to polymerise propylene using the procedure of Examples 10 to 18.

The results obtained are set out in Table 9.

TABLE 9

| Example No. | Type of TiCl₃ (s) | Yield of Solid Polymer (g/mMol TiCl₃) (e) | % Wt of Soluble Polymer (f) |
|---|---|---|---|
| 55 | 49 | 26.7 | 4.4 |
| 56 | 50 | 38.7 | 3.5 |
| 57 | 51 | 27.8 | 6.1 |
| 58 | 51 | 81.4 | 2.0 |
| 59 | 53 | 60.6 | 2.1 |
| 60 | 54 | 49.1 | 2.7 |

Notes to Table 9
(e) and (f) are as defined in Notes to Table 2.
(s) The number refers to the Example describing the milling.

EXAMPLES 61 TO 64

The procedure of Examples 55 to 60 was repeated using 2.5 millimoles of N,N,N',N'-tetramethylethylenediamine in place of the hexamethylphosphoric triamide. The results obtained are given in Table 10.

TABLE 10

| Example No. | Type of TiCl₃ (s) | Yield of Solid Polymer (g/mMol TiCl₃) (e) | % Weight of Soluble Polymer (f) |
|---|---|---|---|
| 61 | 49 | 8.9 | 3.2 |
| 62 | 50 | 14.0 | 1.9 |
| 63 | 51 | 10.5 | 1.6 |
| 64 | 52 | 21.2 | 1.5 |

Notes to Table 3
(e) and (f) are both as defined in Notes to Table 2.
(s) is as defined in Notes to Table 9.

EXAMPLES 65 TO 67

The procedure of Examples 55 to 60 was repeated using propylene containing 0.15% mole of hydrogen and, as the catalyst, 10 millimoles of diethyl aluminium chloride, 0.75 millimoles of hexamethylphosphoric triamide and 2 millimoles of a titanium trichloride product obtained as described in Examples 50, 52 or 53. Polymerisation was effected for a time of three hours and the results obtained are given in Table 11.

TABLE 11

| Example No. | Type of TiCl₃ (s) | Yield of Solid Polymer (g/mMol TiCl₃) (e) | % Weight of Soluble Polymer (f) |
|---|---|---|---|
| 65 | 50 | 5.2 | 1.9 |
| 66 | 52 | 12.8 | 0.8 |
| 67 | 53 | 14.4 | 2.1 |

Notes to Table 11
(e) and (f) are both as defined in Notes to Table 2.
(s) is as defined in Notes to Table 9.

EXAMPLES 68 to 73

The procedure of Examples 55 to 60 was repeated using propylene-containing 0.15% mole of hydrogen and, as the catalyst, 2 millimoles of titanium trichloride product obtained as described in either Example 52 or Example 53, together with the components as indicated in Table 12.

TABLE 12

| Ex. No. | Type of TiCl₃ (s) | TEA (mMol) (t) | DDDPO (mMol) (b) | CHT (mMol) (u) | Yield of Solid Polymer (g/mMol TiCl₃) (e) | % Weight of Soluble Polymer (f) |
|---|---|---|---|---|---|---|
| 68 | 52 | 8 | 4 | 0 | 28.5 | 3.0 |
| 69 | 52 | 8 | 6 | 0 | 22.3 | 2.2 |
| 70 | 52 | 8 | 2 | 1 | 17.4 | 2.4 |
| 71 | 52 | 8 | 3 | 1 | 19.7 | 1.5 |
| 72 | 53 | 8 | 2 | 1 | 20.4 | 2.6 |
| 73 | 53 | 8 | 3 | 1 | 18.9 | 2.1 |

Notes to Table 12
(b) is as defined in Notes to Table 1
(e) and (f) are both as defined in Notes to Table 2
(s) is as defined in Notes to Table 9
(t) TEA is triethyl aluminium
(u) CHT is 1,3,5-cycloheptatriene.

We claim:
1. A process for the treatment of a transition metal compound which comprises grinding a solid compound of a transition metal of Groups IVA to VIA of the Periodic Table in the presence of at least two Lewis Acid compounds which are aluminium chloride and titanium tetrachloride and which are different from the solid compound of the transition metal, and at least one organo-Lewis Base compound selected from the group consisting of compounds of one of the formulae:

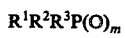

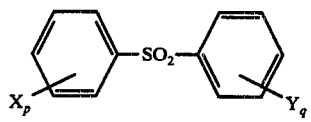

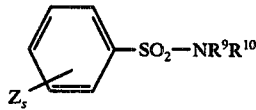

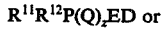

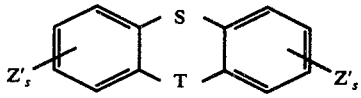

where
$R^1$, $R^2$ and $R^3$ are each, independently, an alkyl or aryl group, or a group —$NR_2^4$ or —$OR^4$;
$R^4$ is an alkyl group of 1 to 4 carbon atoms;
$R^5$ and $R^6$ are hydrocarbyl groups;
X, or each X, is, independently, a halogen atom, an alkyl, aryl, alkoxy, aryloxy, alkylthio, or arylthio group, or a group —$NR^8R^9$, or two groups X can together form a saturated or unsaturated hydrocarbon ring;
Y, or each Y, is, independently, a halogen atom, an alkyl, aryl, alkoxy, aryloxy, alkylthio, or arylthio group, or a group —NR⁸R⁹, or two groups Y can together form a saturated or unsaturated hydrocarbon ring, or a group X and a group Y may be replaced by a link between the two phenyl groups attached to the —SO₂— group, the linkage being either direct or through a group —O—, —CH₂—, —NR⁸—, —S— or —CO—;

R⁸ is a hydrogen atom or a hydrocarbyl group;

R⁹ is a hydrocarbyl group;

Z, or each Z is, independently, a halogen atom, an alkyl, aryl, alkoxy, aryloxy, alkylthio, or arylthio group, or a group —NR⁸R⁹, or two groups Z can together form a saturated or unsaturated hydrocarbon ring;

R¹⁰ is a hydrocarbyl group or a group

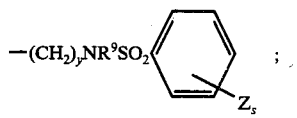

R¹¹ is a halogen atom, a hydrocarbyl group, a group —NR₂⁹ or —OR⁹, a heterocyclic group or a group (E-L-G);

R¹² is a halogen atom, a hydrocarbyl group, a group —NR₂⁹ or —OR⁹, a heterocyclic group, a group (E-L-G) or ED; each E is —O—, —S—, or —NR⁹—, and may be the same or different;

G is —OR⁹, —SR⁹, —NR⁹₂, —PR⁹₂ or a heterocyclic ring system whereof the heteroatom is O, S, N, or P;

D is a group —LG or —P(Q)ₓR¹¹R¹², or, when R¹² is ED, both the D groups may together form a group —L—;

L is a bivalent hydrocarbyl radical such that E and G or E and E are separated by not more than 3 carbon atoms;

Q is an oxygen or sulphur atom;

T is —S—, —O—, —NR⁹—; or —CO—;

Z', or each Z', is independently a halogen atom, an alkyl, aryl, alkoxy, aryloxy, alkylthio or arylthio group, or a group —NR⁸R⁹;

m is 0 or 1;

n is 1, 2 or 3;

p and q are each, independently, an integer from 0 up to 5;

s is an integer from 0 up to 5;

y is a positive integer; and z is 0 or 1, wherein the grinding is effected in the presence of a total amount of aluminium chloride in the range from 0.34 up to 1.83 mole for each gramme atom of the transition metal which is present in the solid compound of the transition metal; the number of moles of the organo-Lewis Base compound does not exceed the number of gramme atoms of the transition metal which is present in the solid compound of the transition metal, and the grinding being effected at a temperature of from −10° C. up to 100° C. for a time of at least 5 hours.

2. The process of claim 1 wherein the total amount of aluminium chloride is in the range from 0.38 up to 1.33 mole for each gramme atom of the transition metal which is present in the solid compound of the transition metal.

3. The process of claim 1 in which a material of the formula TiCl₃bAlCl₃ where b is from 0 up to about 0.33 is ground in the presence of an amount of separately added aluminium chloride which is in the range from 0.01 up to 1.50 mole for each gramme atom of titanium present in the material TiCl₃bAlCl₃.

4. The process of claim 3 in which the material TiCl₃bAlCl₃ is ground in the presence of an amount of separately added aluminium chloride which is in the range from 0.20 up to 0.50 mole for each gramme atom of titanium present in the material TiCl₃bAlCl₃.

5. The process of claim 1 in which grinding is effected in the presence of from 0.01 up to 0.50 mole of titanium tetrachloride for each gramme atom of the transition metal which is present in the solid compound of the transition metal.

6. The process of claim 1 in which grinding is effected in the presence of from 0.10 up to 1.0 mole of the organo-Lewis Base compound for each gramme atom of the transition metal which is present in the solid compound of the transition metal.

7. The process of claim 1 in which grinding is effected in the presence of an amount of the organo-Lewis Base compound which is given by the relationship L.B. = [TiCl₄] + 0.5[AlCl₃] ± 0.10 where

L.B. is the amount of the organo-Lewis Base compound in moles;

[TiCl₄] is the amount of titanium tetrachloride in moles; and

[AlCl₃] is the total amount of aluminium chloride in moles, including any aluminium chloride which is present associated with the solid compound of the transition metal.

8. The process of claim 1 which comprises grinding titanium trichloride in the presence of at least from 0.34 up to 1.83 mole of aluminium chloride, from 0.01 up to 0.50 mole of titanium tetrachloride and from 0.10 up to 1.0 mole of at least one organo-Lewis Base compound for each gramme atom of titanium which is present in the titanium trichloride.

9. The process of claim 1 wherein grinding is effected by ball milling at a temperature from −10° C. up to 100° C. for a time of from 5 hours up to 100 hours.

10. An olefine polymerisation catalyst comprising
1. a ground transition metal compound which has been obtained by the process of claim 1; and
2. a least one organo-metallic compound of aluminium, or of a non-transition metal of Group IIA of the Periodic Table, or a complex of an organo-metallic compound of a non-transition metal of Group IA or IIA of the Periodic Table and an organo-aluminium compound.

11. The catalyst of claim 10 which also contains
3. an organo-Lewis Base compound which is a compound of one of the formula R¹R²R³P(O)ₘ 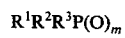

R⁵R⁶R⁷N 

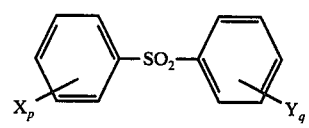

-continued

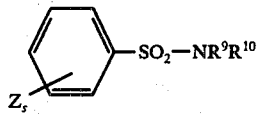

$R^{11}R^{12}P(Q)_zED$ or

-continued

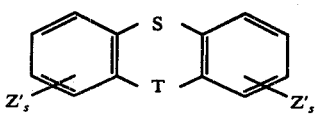

where
D, E, Q, $R^1$, $R^2$, $R^3$, $R^5$, $R^6$, $R^7$, $R^9$, $R^{10}$, $R^{11}$, $R^{12}$, X, Y, Z, Z', m, p, q, s and z are all as defined.

12. The catalyst of claim 11 wherein component (3) is hexamethylphosphoric triamide; 2-dimethylamino-1,3-dimethyl-1,3,2-diazaphospholidine-2-oxide; N,N,N',N',N"-pentamethyl-N"-β-dimethylaminoethylphosphoric triamide; N,N,N',N'-tetramethylethylenediamine; tributylamine or diphenylsulphone.

13. The catalyst of claim 10 which also contains a substituted or unsubstituted polyene.

* * * * *